United States Patent [19]
Quick et al.

[11] Patent Number: 6,096,212
[45] Date of Patent: Aug. 1, 2000

[54] FLUID FILTER AND METHOD OF MAKING

[75] Inventors: Nathaniel R. Quick, Lake Mary; Tao Li, Deland; Robert Malanga, Longwood, all of Fla.

[73] Assignee: USF Filtration and Separations Group, Inc., Timonium, Md.

[21] Appl. No.: 09/094,411

[22] Filed: Jun. 9, 1998

Related U.S. Application Data

[60] Provisional application No. 60/048,943, Jun. 10, 1997.
[51] Int. Cl.$^7$ .................................................. B01D 29/15
[52] U.S. Cl. ................... 210/493.2; 210/496; 210/510.1; 228/193; 228/262.41
[58] Field of Search .............................. 210/493.1, 493.2, 210/493.5, 496, 497.01, 510.1; 228/175, 190, 193, 262.41; 419/8

[56] References Cited

U.S. PATENT DOCUMENTS

| | | |
|---|---|---|
| 945,632 | 1/1910 | Strahl . |
| 2,413,991 | 1/1947 | Neuman . |
| 2,642,187 | 6/1953 | Bell . |
| 2,877,903 | 3/1959 | Veres . |
| 2,957,235 | 10/1960 | Steinberg . |
| 3,379,000 | 4/1968 | Webber et al. . |
| 3,423,909 | 1/1969 | Bennett et al. . |
| 3,490,902 | 1/1970 | Fisher . |
| 3,498,464 | 3/1970 | Frosoline . |
| 3,505,038 | 4/1970 | Luksch et al. . |
| 3,716,347 | 2/1973 | Bergstrom et al. . |
| 4,114,794 | 9/1978 | Storms . |
| 4,169,059 | 9/1979 | Storms . |
| 4,186,099 | 1/1980 | Henschel, Jr. . |
| 4,290,889 | 9/1981 | Erickson . |
| 4,304,580 | 12/1981 | Gehl et al. . |
| 4,350,592 | 9/1982 | Kronsbein . |
| 4,676,843 | 6/1987 | Nazmy . |
| 4,728,421 | 3/1988 | Moddenmeyer . |
| 4,764,275 | 8/1988 | Robichaud . |
| 4,875,616 | 10/1989 | Nixdorf . |
| 5,015,316 | 5/1991 | Ostreicher et al. . |
| 5,211,846 | 5/1993 | Kott et al. . |
| 5,230,760 | 7/1993 | Tanabe . |
| 5,298,160 | 3/1994 | Ayers et al. . |
| 5,350,515 | 9/1994 | Stark et al. . |
| 5,395,039 | 3/1995 | Koehler et al. .......................... 210/496 |
| 5,545,323 | 8/1996 | Koehler et al. . |

Primary Examiner—Matthew O. Savage
Attorney, Agent, or Firm—Frijouf, Rust & Pyle, P.A.

[57] ABSTRACT

A fluid filter assembly and method of making is disclosed for filtering a fluid. The fluid filter assembly comprises a first filter component including a filter media comprising a matrix of metallic fibers. A second filter component includes a filter support. A sinter bond bonds the matrix of metallic fibers of the filter media to the second filter component.

18 Claims, 12 Drawing Sheets

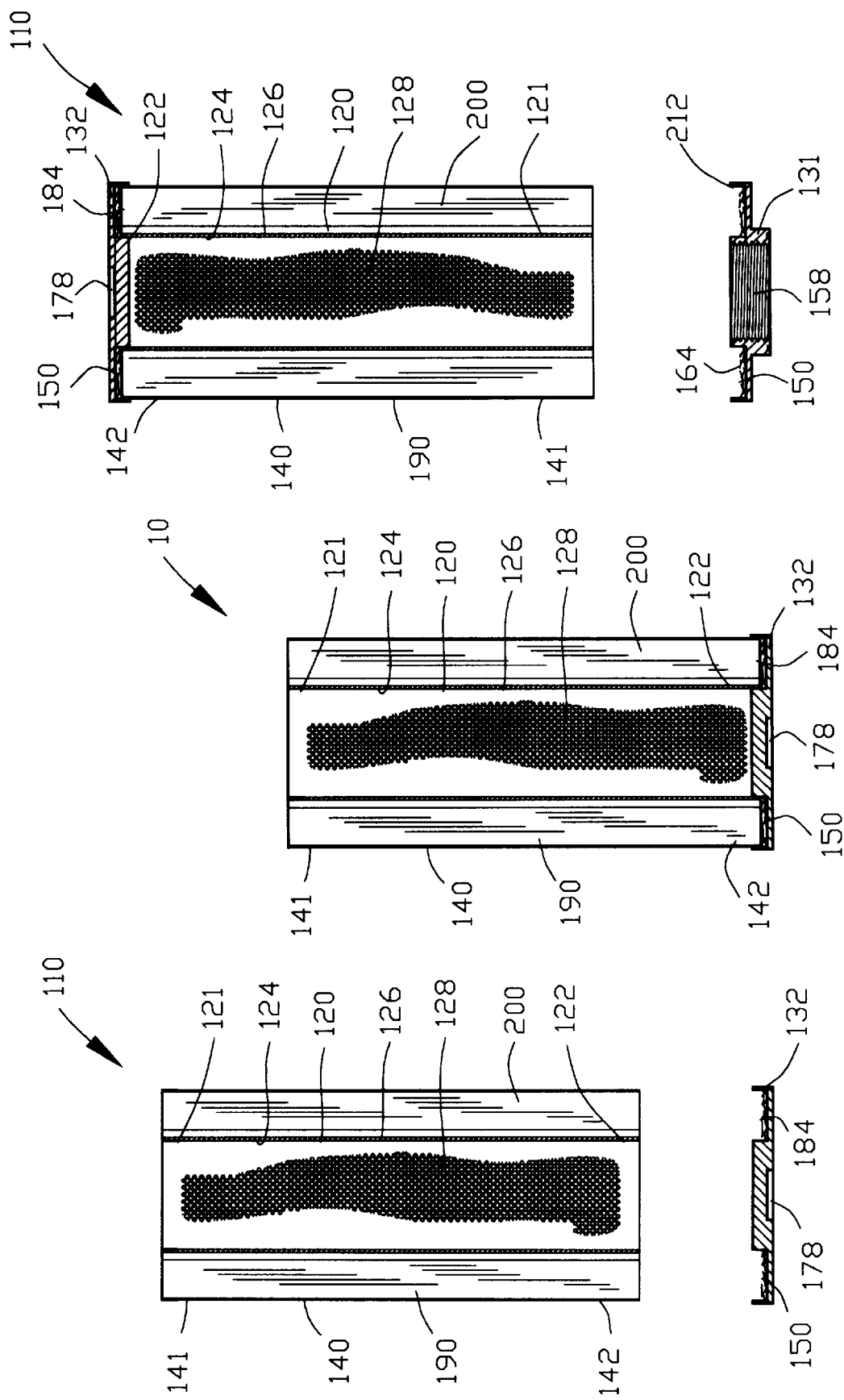

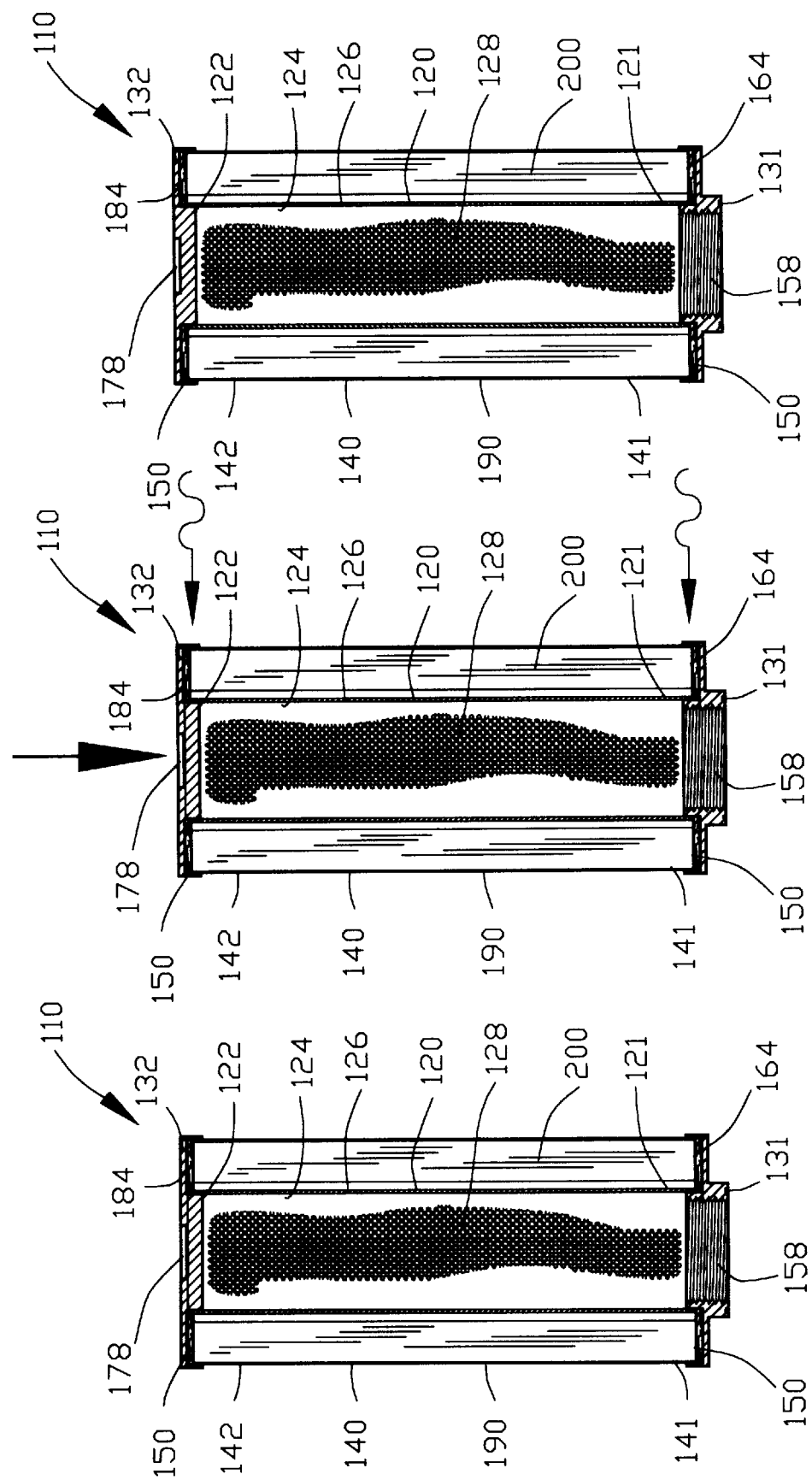

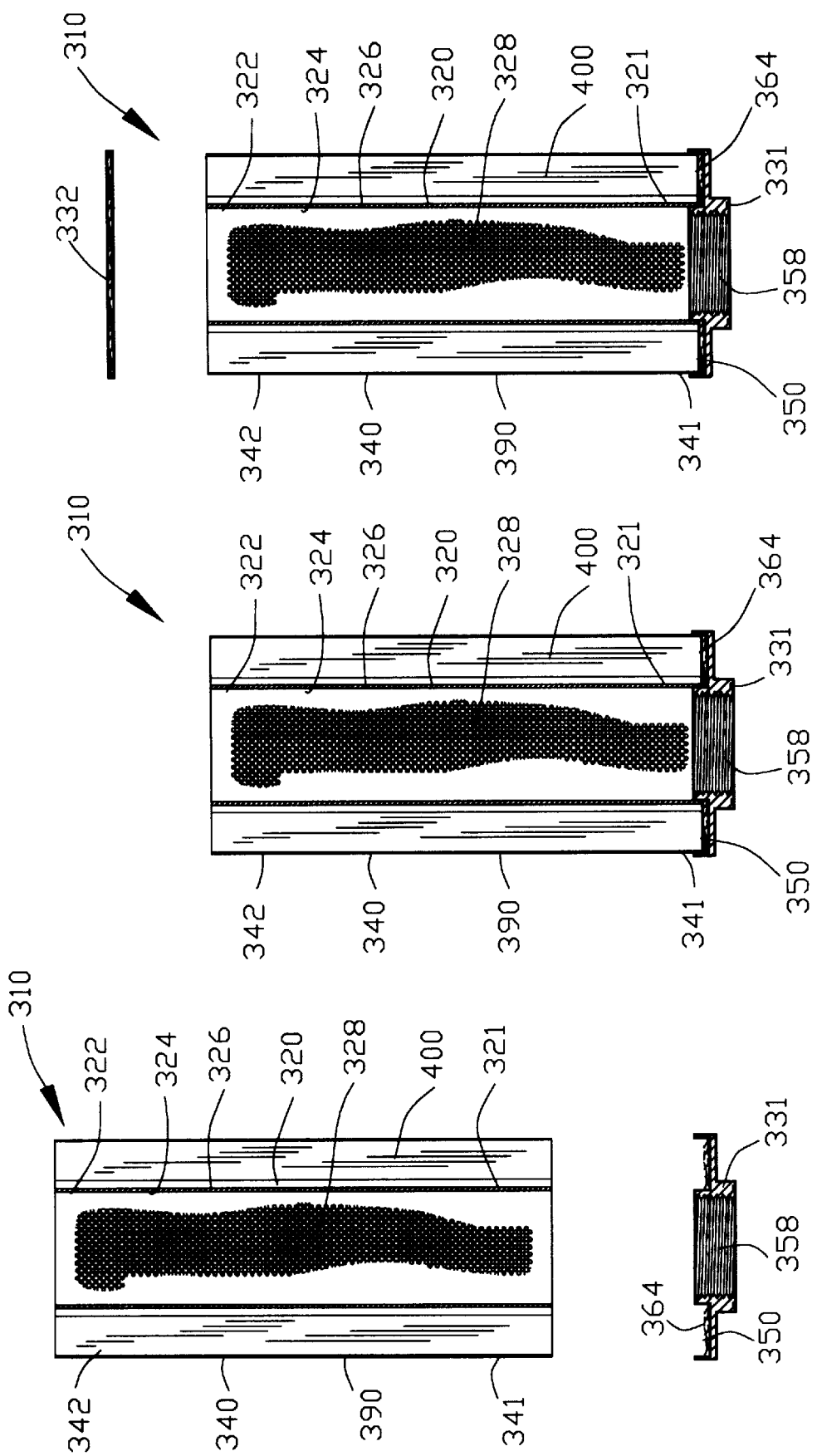

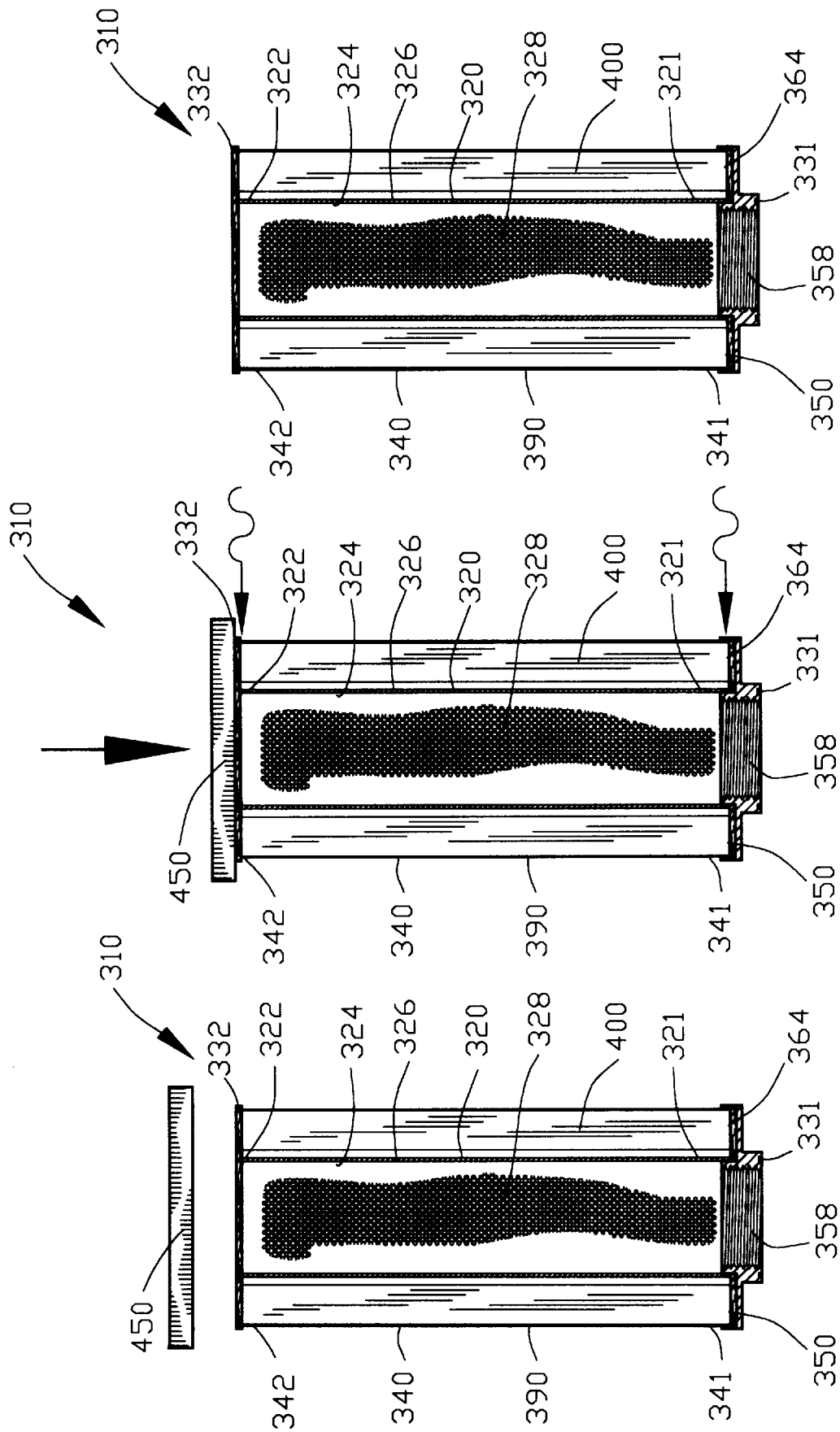

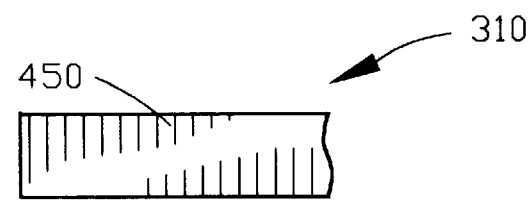
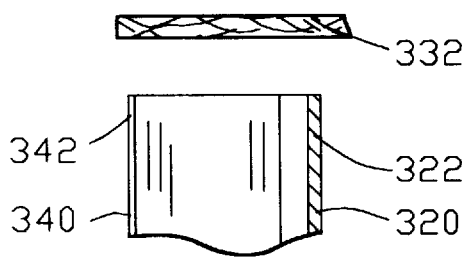
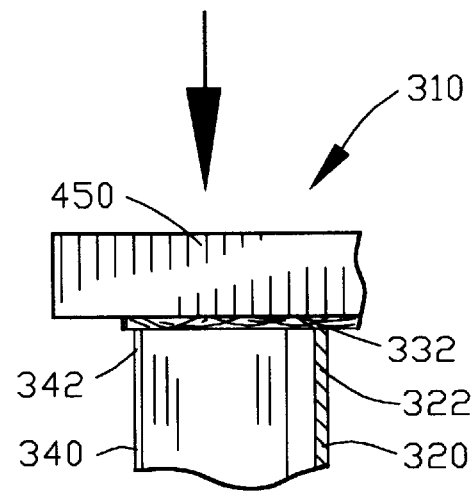
FIG. 40    FIG. 41
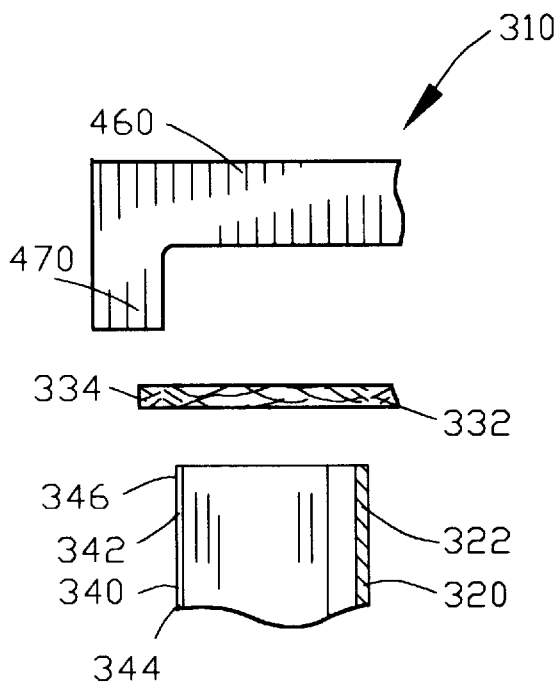
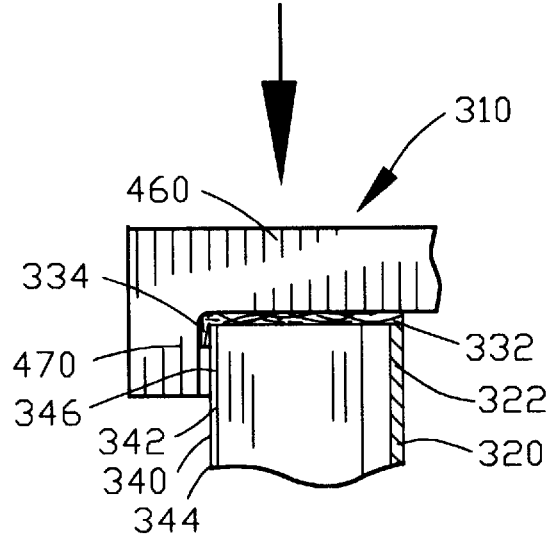
FIG. 42    FIG. 43

FLUID FILTER AND METHOD OF MAKING

CROSS-REFERENCE TO RELATED APPLICATIONS

This application claims benefit of U.S. Patent Provisional application Ser. No. 60/048,943 filed Jun. 10, 1997.

BACKGROUND OF THE INVENTION

1. Field of the Invention

This invention relates to the filtering of a fluid and more particularly to a fluid filter and method of making incorporating a sintered bonding material for securing filter media.

2. Background of the Invention

Various apparatuses and methods have been utilized by the prior art for removing suspended contaminants from a contaminated fluid. In general, the contaminated fluid is passed through a porous filtering media by an external pressure or an external force. The pore size of the porous filtering media is selected to permit the passage of the fluid therethrough while inhibiting the flow of contaminants through the porous filtering media. The contaminants are blocked by the porous filter media while the fluid passes through the porous filter media. The fluid flowing through the filter media is purged of the contaminants.

After a period of time, the contaminants collected by the filter media overlay the pores of the porous filter media thereby blocking the pores and reducing the passage of the fluid therethrough. The blockage of the pores of the filter media by the collected contaminants reduce the flow rate of the fluid through the fluid filter thereby rendering the fluid filter unsuitable for continued used. In many cases, the fluid filter was discarded and replaced with a new fluid filter to reestablish the desired flow rate of the fluid in the fluid filtering process.

In a typical fluid filter, a porous filter media is secured to a filter support or the like for mounting or suspending the filter media. In the case of a cylindrical filter, the filter media is formed into a cylindrical configuration and a first and a second cylindrical end of the filter media are bonded to a first and a second filter support such as a first and a second end cap. The first and second end caps mount the filter media relative to a fluid input source and a fluid output source. In many cases, a braze material is used for affixing the first and second cylindrical ends of the filter media to the first and second end caps.

In one example of the construction of the fluid filter, the first end cap was placed on the horizontal surface facing upwardly and filled with a braze material. The first end of the filter material was inserted into the braze material contained within the first end cap and the assembly was heated for melting the braze material to bond the first end of the cylindrical filter media to the first end cap. A second end cap was placed on a horizontal surface facing upwardly and was filled with a braze material. The second end of the filter material was inserted within the braze material contained within the second end cap and the assembly was heated for melting the braze material to bond the second end of the cylindrical filter media to the first end cap. A distinct disadvantage of the aforementioned process was that the bonding of both the first and second cylindrical ends of the filter media required two separate and distinct heating processes.

Some in the prior art have used a combination of a powdered first braze material having a first melting point, a powdered second braze material having a second melting point, and a binder material for controlling the position and migration of the powdered braze material during the heating process. The use of the binder material enabled the powdered braze materials to be positioned within an inverted end cap to allow both the first and the second ends of the cylindrical filter media to be bonded to the first and second end caps during a single heating process. The binder material prevented the powder braze materials from being discharged from the inverted end cap. In addition, the binder material inhibited the migration or wicking of the braze material into the filter media during the heating process. The binder material was burnt away leaving only the braze material to bond the first and second ends of the cylindrical filter media to the first and second end caps.

U.S. Pat. No. 2,642,187 to Bell discloses a replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to folds of the pleats, said adhesive lying between inner faces of the turned down rims and the folds of the pleats in contact therewith.

U.S. Pat. No. 2,877,903 to Veres discloses a unit for filtering particulate matter from a fluid flowing therethrough, a hollow filter body comprising a screen equipped with a screen closure at one end thereof, a cap substantially closing the other end of said screen body and defining connecting means for communicating the interior of said filter body with a fluid flow line, and a mass of pellets defining a substantially continuous coating along the outer surface of the screen end closure and screen body and being bonded to each other and to the screen body and end closure to form an integrated structure therewith, whereby both said screen body and screen end closure define filtering areas through which fluid may pass to the interior of the screen body.

U.S. Pat. No. 2,957,235 to Steinberg discloses a method of assembling first and second elements composed of a mixture of powdered metal and resinous binder comprising placing said first element on a support, heating said first element until said resin binder therein becomes pliable without the element losing shape, placing said second element against said first element, applying pressure to said second element until a bond is formed by the resinous binder between said first and second elements, removing the elements from said support, cooling the assembly of said elements, supporting said assembly with sinter material in a sintering zone, and sintering said assembly into a unitary sintered structure.

U.S. Pat. No. 3,490,902 to Fisher discloses a method for forming porous structures useful, for example, as filters, diffusion membranes, sound absorbers, and the like. The structures contain a sintered metal portion at least one surface of which having embedded and bonded thereto a reinforcing member. Some of the fibers in the fiber metal portion are bonded to each other and to the reinforcing member.

U.S. Pat. No. 3,716,347 to Bergstrom et al. discloses metal parts joined together with sintered powdered metal by applying a mixture of powdered metal and an organic heat-fugitive binder to the parts at the locus of the joint to be formed therebetween, assembling the parts in their desired joined configuration, and heating the assembly to volatilize or burn-off the binder and sinter the powdered metal.

U.S. Pat. No. 4,114,794 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,169,059 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,290,889 to Erickson discloses a new and unique means for preventing the crowns of a backflushable filter element unit from splitting which has heretofore been caused by the cyclic action of the cleaning and backflushing. A layer of staple material is positioned adjacent the outer layer of filter media to prevent bellowing or ballooning. An additional staple layer may be positioned adjacent the inner layer of filtered media to provide additional support. With both staple layers in position on both sides of the filter media, the media is firmly captured and the crowns will not split.

U.S. Pat. No. 4,676,843 to Nazmy discloses two component workpieces consisting of different superalloys or of the same superalloy are bonded together to form a monolithic whole, with the insertion of a layer 1–2 mm thick consisting of a powder of composition similar to or identical to that of the component workpieces, by hot pressing in accordance with the diffusion bonding process. The workpiece surfaces to be bonded do not have to have narrow tolerances, but are with advantage provided with grooves.

U.S. Pat. No. 4,875,616 to Nixdorf discloses a method for producing a high temperature, high strength bond between a ceramic shape and a metal substrate, such as joining a ceramic cap to a piston for an internal combustion engine. The composite joint is effected through the use of a ceramic preform fabricated using fibers, whiskers, platelets or sponge-like particles having the same composition as the ceramic body. The preform is joined to the ceramic shape by using a ceramic slip having a ceramic corresponding in composition with the ceramic body, with this juncture being heated to achieve a secure bond. The preform is joined to the metal substrate by first infiltrating the preform with molten material corresponding to the substrate, and then pressure bonding the infiltrated preform to the substrate after the molten material has solidified. The substrate can be metal or metal alloy. An example is given for the bonding of silicon carbide to a 300 series aluminum.

U.S. Pat. No. 5,230,760 to Tanabe discloses a filter cartridge of micro filtration membrane pleats type, by which it is possible to stably manufacture products of high quality and to reduce the manufacturing cost. In the method for manufacturing a filter cartridge of micro membrane pleats according to the present invention, an initial portion and a last portion with pleats of a micro filtration membrane are welded together to prepare an endless micro membrane, and a filter element provided with a micro filtration membrane is welded on two end plates. A thin bonding auxiliary plate made of the same material as the end plates, having an opening at its center and molten at relatively low temperature, is welded to filter element and end plates which are heated in advance.

U.S. Pat. No. 5,350,515 to Stark et. al. discloses a filter cartridge including a cylindrical filter medium potted into a top cap, and having an internally potted bottom closure molded in place inside the filter medium.

U.S. Pat. No. 5,395,039 to Koehler et. al. discloses such a braze material and process. The same braze material and process is disclosed by a prior NICROBRAZ Technical Bulletin of 1991 published by the Wall Colmony Corporation regarding a braze material sold under the trademark "NICROBRAZ".

U.S. Pat. No. 5,545,323 to Koehler et al. discloses a filter assembly and a method of making a filter assembly described wherein a filter pack is seated in an end cap and contacted with a particulate material and a settling liquid of low viscosity to form a filter assemblage. The filter assemblage is sintered to form a strong, virtually impermeable bond therebetween.

Another disadvantage of the aforementioned brazing process is the introduction of foreign braze materials into the filter assembly. In many cases, the filter media and the filter support are made of the same type of material which is selected to be impervious to the fluids flowing through the filter media. The brazing process introduced braze materials that are dissimilar to the type of material of filter media and end caps. Accordingly, the compatibility of the type of braze material must be considered for use with the fluid to be filtered by the filter media.

Others in the prior art have devised devices and methods for cleaning the fluid filter to remove the contaminants collected by the filter media. Typically, the process of removing the contaminants from the filter media involved the flow of a solvent material such as acids, bases and organics or the like through the filter media in a direction opposite to the direction of the fluid through the fluid filter. In some cases, the solvent material was passed through the filter media when the fluid filter was raised to an elevated temperature.

In many cases, a reusable fluid filter is used for polymer melt, gas and hydraulic filtration. The effective costs of a reusable fluid filter may be decreased by increasing the useful life of the reusable fluid filter. The useful life of the reusable fluid filter is determined by the number of high temperature, corrosive solvent cleaning cycles the reusable fluid filter can be subjected to without deterioration. One of the more important components is the material used to secure the filter media within the fluid filter. This material must be capable of withstanding the same cleaning, processing and manufacturing conditions as the filter media.

Therefore, it is an object of this invention to provide an improved fluid filter assembly and method of making incorporating a filter media which is bonded to a filter support through the use of a sintered fiber material.

Another object of this invention is to provide an improved fluid filter assembly and method of making wherein the filter media is secured to the filter support through the use of sintered metallic fibers of the same material type as the filter media and the filter support.

Another object of this invention is to provide an improved fluid filter assembly and method of making incorporating a sintered bonding pad of partially sintered metallic fibers for bonding the filter media to the filter support.

Another object of this invention is to provide an improved fluid filter assembly and method of making which enables a first and a second end of a cylindrical filter media to be bonded to a first and a second end cap in a single heating process.

Another object of this invention is to provide an improved fluid filter assembly and method of making which increases the surface area of filter media for increasing the capacity for collecting contaminants from the fluid.

Another object of this invention is to provide an improved fluid filter assembly and method of making incorporating a filter media which is bonded to a filter support through the use of a sintered fiber material and which eliminates the need for a braze material.

Another object of this invention is to provide an improved fluid filter assembly and method of making incorporating a filter media which is bonded to a filter support through the use of a sintered bonding fiber such as scrap filter media fibers.

Another object of this invention is to provide an improved fluid filter assembly and method of making which substantially lowers the cost of the filter assembly by eliminating the need for a braze material.

Another object of this invention is to provide an improved fluid filter assembly and method of making incorporating a filter media which is bonded to a filter support through the use of a sintered fiber material that is capable of withstanding a cleaning solvent and an elevated temperature.

Another object of this invention is to provide an improved fluid filter assembly and method of making having a filter media of uniform small diameter metallic fibers of less than 100 microns.

Another object of this invention is to provide an improved fluid filter assembly and method of making having a filter media of uniform small diameter metallic fibers formed through a wire drawing process to provide superior filtering capability for collecting contaminants from a fluid.

Another object of this invention is to provide an improved fluid filter assembly and method of making wherein the fluid filter insert is assembled with filter media to have superior sealing characteristics.

Another object of this invention is to provide an improved fluid filter assembly and method of making that is reliable for use over an extended period of time.

Another object of this invention is to provide an improved fluid filter assembly and method of making wherein a filter support is formed from a sintered assembly of metallic fibers.

Another object of this invention is to provide an improved fluid filter assembly and method of making wherein a filter media is bonded to a filter end member through the use of a sintered bond for bonding the filter media to the filter end member.

Another object of this invention is to provide an improved fluid filter assembly and method of making wherein a filter media which is directly bonded to a filter end member without the use of any additional bonding materials.

Another object of this invention is to provide an improved fluid filter assembly incorporating a filter end member which is formed from a sintered assembly of metallic fibers that replaces a conventional end cap of a filter insert.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a fluid filter assembly and method of making for filtering a fluid. The fluid filter assembly comprises a first filter component having a filter media comprises a matrix of metallic fibers. A second filter component including a filter support. A sinter bond bonds the matrix of metallic fibers of the filter media to the second filter component.

Preferably, the filter media comprises a matrix of metallic fibers with each of the metallic fibers being formed through a wire drawing process to provide a uniform diameter for uniformly filtering the fluid.

In one embodiment of the invention, the first filter component comprises a filter element including a core member having a first and a second core end with a plurality of apertures defined within the core member. The core member supports the filter media for enabling the fluid to flow through the filter media and to flow through the plurality of apertures defined within the core member.

In another embodiment of the invention, the second filter component comprises a filter support comprising an end support having an annular recess. The array of metallic bonding fibers is disposed in the annular recesses for sinter bonding the filter element to the filter support.

In another embodiment of the invention, the second filter component comprises a filter end member formed from a sintered assembly of metallic fibers. The filter end member comprises a sintered assembly of randomly oriented metallic fibers compressed into a generally rigid filter end member.

Preferably, the filter support and the filter media are the same type of material as the bonding fibers. The bonding fibers are formed through a wire drawing process to provide a uniform diameter thereto. Each of the bonding fibers may have a diameter less than or equal to each of the metallic fibers of the filter media.

In one embodiment of the invention, the bonding fibers comprise randomly oriented metallic fibers disposed between the filter media and the filter support. In another embodiment of the invention, the bonding fibers comprise a resilient pad formed from a sintered matrix of randomly oriented metallic fibers disposed between the filter element and the filter support. The bonding fibers may comprise a resilient pad formed from an uncompressed sheet of a sintered matrix of randomly oriented metallic fibers disposed between the filter element and the filter support.

In a further embodiment of the invention, the bonding fibers comprise a first and a second layer disposed between the filter element and the filter support. The first layer comprising randomly oriented metallic fibers. The second layer comprises a resilient pad formed from a sintered matrix of randomly oriented metallic fibers disposed between the filter element and the filter support.

The invention is also incorporated into the method of making the fluid filter assembly comprising the steps of fabricating a first filter component including a filter media formed from a matrix of metallic fibers and a second filter component. The first filter component is sinter bonded to the second filter component by applying heat for melting at least the surface of each of the metallic fibers to create the sinter bond thereby. Preferably, the step of applying heat to sinter bond the filter element to the filter support includes applying heat for melting at least the surface of each of the metallic bonding fibers. In one embodiment of the invention, the step of applying heat to sinter bond the filter element to the filter support includes applying heat in a hydrogen atmosphere for melting at least the surface of each of the metallic bonding fibers.

In another embodiment of the invention, the step of applying heat to sinter bond the filter element to the filter support includes applying heat in a batch process or a continuous process. The application of the heat to sinter bond the filter element to the filter support may include the application of the localized heat such as infrared heating, induction heating, laser heating or the like.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 21 illustrates a first step in the method of making the fluid filter insert showing a second support being oriented facing upwardly and the introduction of bonding fibers into a second annular recess;

FIG. 22 illustrates a second step in the method of making the fluid filter insert showing the insertion of a second core end and a second filter media end into the bonding fibers disposed in the second annular recess;

FIG. 23 illustrates a third step in the method of making the fluid filter insert showing the inversion of the first support, the core member and the filter media and the introduction of bonding fibers into a first annular recess;

FIG. 24 illustrates a fourth step in the method of making the fluid filter insert showing the insertion of a first core end and a first filter media end into the bonding fibers disposed in the first annular recess;

FIG. 25 illustrates a fifth step in the method of making the fluid filter insert showing the application of a compressive force and the application of heat for sintering the bonding fibers disposed in the first and second annular recesses;

FIG. 26 illustrates a sixth step in the method of making the fluid filter insert showing the core member and the filter element secured to the first and second supports;

FIG. 34 illustrates a first step in the method of making the fluid filter insert showing a first support being oriented facing upwardly and the introduction of bonding fibers into a first annular recess;

FIG. 35 illustrates a second step in the method of making the fluid filter insert showing the insertion of a first core end and a first filter media end into the bonding fibers disposed in the first annular recess;

FIG. 36 illustrates a third step in the method of making the fluid filter insert showing the positioning of a second support formed from a sintered assembly of metallic fibers adjacent to a second core end of the core member;

FIG. 37 illustrates a fourth step in the method of making the fluid filter insert showing the engagement of the second support with the second core end and the positioning of a mold adjacent to the second support, FIG. 38 illustrates a fifth step in the method of making the fluid filter insert showing a mold applying a compressive force for pressing the second support against the second core end of the core member during the application of heat;

FIG. 39 illustrates a sixth step in the method of making the fluid filter insert showing the core member and the first filter component secured to the first and second supports;

FIG. 40 is a magnified partial view of FIG. 37 illustrating the positioning of the second support adjacent to the second core end of the core member and the positioning of a first type of mold adjacent to the second support;

FIG. 41 is a magnified partial view of FIG. 38 illustrating the mold applying a compressive force for pressing the second support against the second core end of the core member during the application of heat;

FIG. 42 is a magnified partial view of FIG. 37 illustrating the positioning of the second support adjacent to the second core end of the core member and the positioning of a second type of mold adjacent to the second support; and FIG. 43 is a magnified partial view of FIG. 38 illustrating the mold applying a compressive force for pressing the second support against the second core end of the core member during the application of heat.

Similar reference characters refer to similar parts throughout the several Figures of the drawings.

DETAILED DISCUSSION

Figure 1:
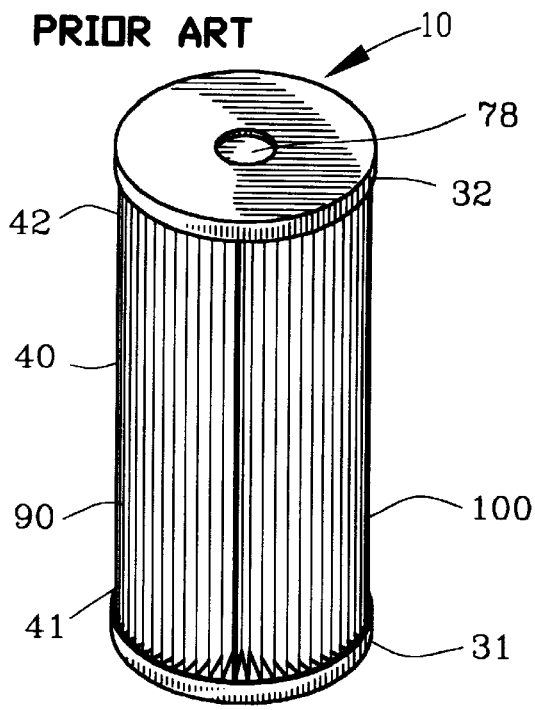
FIG. 1 is a top isometric view of a fluid filter insert of the prior art.
Figure 2:
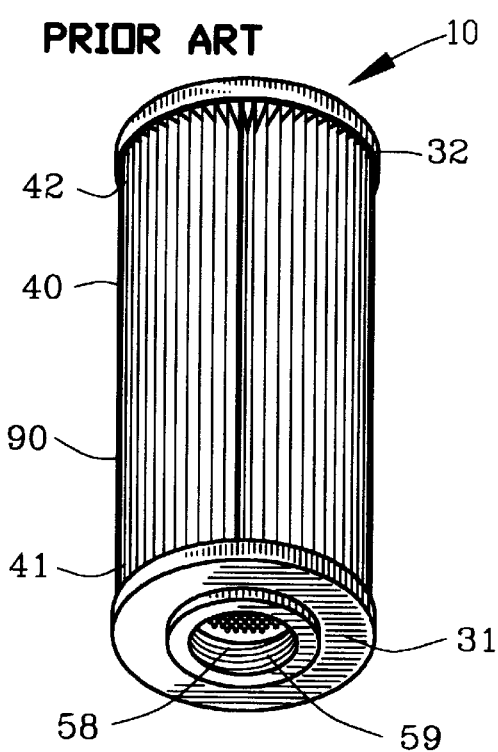
FIG. 2 is a bottom isometric view of the fluid filter insert of the prior art.

FIGS. 1 and 2 are top and bottom isometric views of a fluid filter insert 10 of the prior art. The fluid filter insert 10 is designed for use within a conventional filter housing (not shown) for filtering suspended contaminants such as filtering contaminants from a fluid (not shown). As use herein, the term fluid is meant to include both liquids and gases. A fluid may range from a high or low viscosity liquid phase material such as a polymer to a gas phase material.

Figure 3:
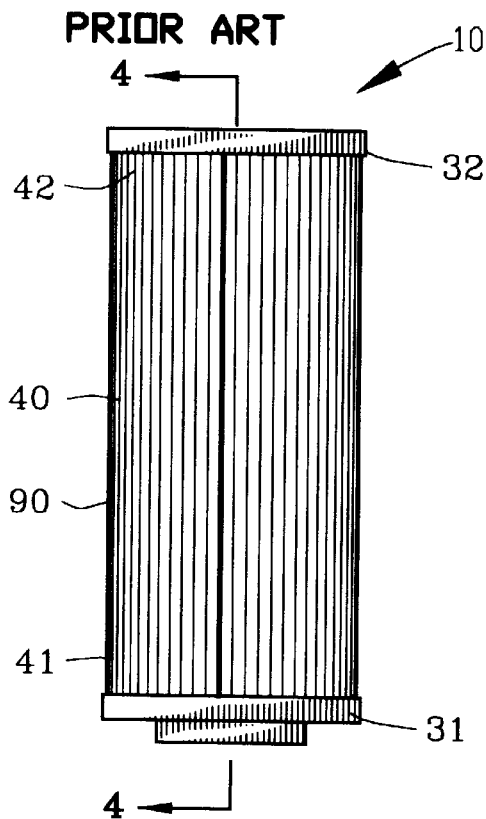
FIG. 3 is a side elevational view of FIG. 1.
Figure 4:
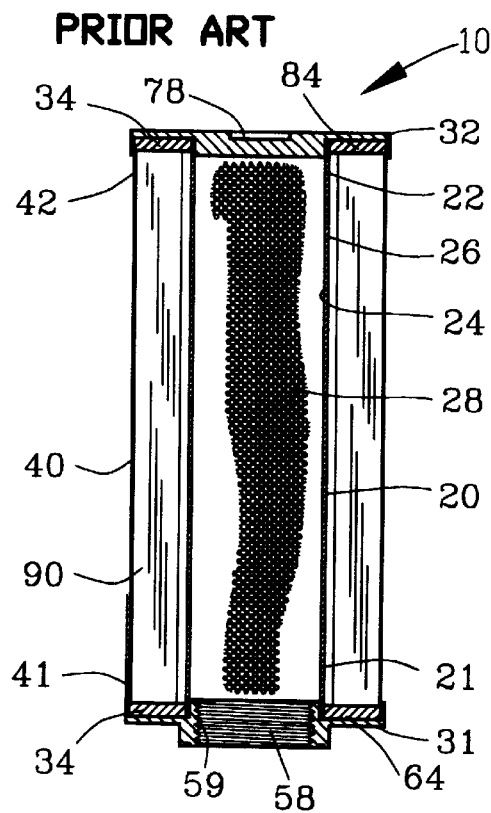
FIG. 4 is a sectional view along line 4—4 in FIG. 3.

FIG. 3 is a side elevational view of the fluid filter insert 10 of FIGS. 1 and 2 with FIG. 4 being a sectional view thereof. As best shown in FIG. 4, the fluid filter insert 10 comprises a core member 20 extending between a first and a second core end 21 and 22 with the core member 20 being substantially cylindrically defined by an inner and outer cylindrical surface 24 and 26. A plurality of apertures 28 defined within the core member 20 to extend between the inner and outer cylindrical surfaces 24 and 26 for enabling fluid passage therethrough. The core member 20 is disposed between a first and a second end member 31 and 32.

The fluid filter insert 10 comprises a filter media 40 having a first and a second filter media end 41 and 42. The first and second core ends 21 and 22 of the core member 20 and the first and second filter media ends 41 and 42 of the filter media 40 are respectively secured to the first and second end members 31 and 32 by the braze material 34 such as a metal powder or the like.

The first end member 31 comprises a central orifice 58 provided with threads 59 for affixing the fluid filter insert 10. The central orifice 58 provides communication to the interior of the core 20. A first annular recess 64 has a general cup-shape defined within the first end member 31 for retaining the braze material 34 therein when the first end member 31 is inverted relative to the position shown in FIG. 4.

The first core end 21 of the core member 20 and the first filter media end 41 of the filter media 40 are disposed within the first annular recess 64. The braze material 34 is disposed within the first annular recess 64 for securing first core end 21 of the core member 20 and the first filter media end 41 of the filter media 40 to the first end member 31.

The second end member 32 comprises a central respite 78 for positioning the fluid filter insert 10 relative to a mounting (not shown). A second annular recess 84 has a general cup-shape defined within the second end member 32 for retaining the braze material 34 when the second end member 32 is positioned as shown in FIG. 4. The second core end 22 of the core member 20 and the second filter media end 42 of the filter media 40 are disposed within the second annular recess 84. The braze material 34 is disposed within the second annular recess 84 for securing the second core end 22 of the core member 20 and the second filter media end 42 of the filter media 40 to the second end member 32.

The first and second core ends 21 and 22 of the cylindrical core member 20 are secured to the first and second end members 31 and 32 for enabling fluid communication between the central orifice 58 of the first end member 31 and the outer cylindrical surface 26 of the core member 20 through the plurality of apertures 28 therein.

The filter media 40 is shown as generally cylindrical and coaxially disposed relative to the cylindrical core member 20. The filter media 40 defines a general pleated or accordion shape for increasing the surface area of the filter media 40. The filter media 40 filters suspended contaminates in the fluid flowing through the filter media 40 via the central orifice 58 of the first end member 31 and the plurality of apertures 28 of the core member 20.

The first annular recess 64 retains the braze material 34 enabling the first core end 21 of the core member 20 and the first filter media end 41 of the filter media 40 to be mechanically inserted into the braze material 34. In a similar manner, the second annular recess 84 retains the braze material 34 enabling the second core end 22 of the core member 20 and the second filter media end 42 of the filter media 40 to be mechanically inserted into the braze material 34.

In accordance with the teaching of the NICROBRAZ Technical Bulletin of 1991, supra, a binder material is incorporated with the braze material 34 to limit the flow of the braze material 34 during the melting and solidification thereof. The use of the binder material enables one of the first and second end members 31 and 32 to be inverted during the melting and solidification of the braze material 34 for allowing the simultaneous heating of the first and second end members 31 and 32. The flow of the braze material 34 during the molten state seals and secures the first and second core ends 21 and 22 of the core member 20 and the first and second filter media ends 41 and 42 to the first and second end members 31 and 32.

Figure 5:
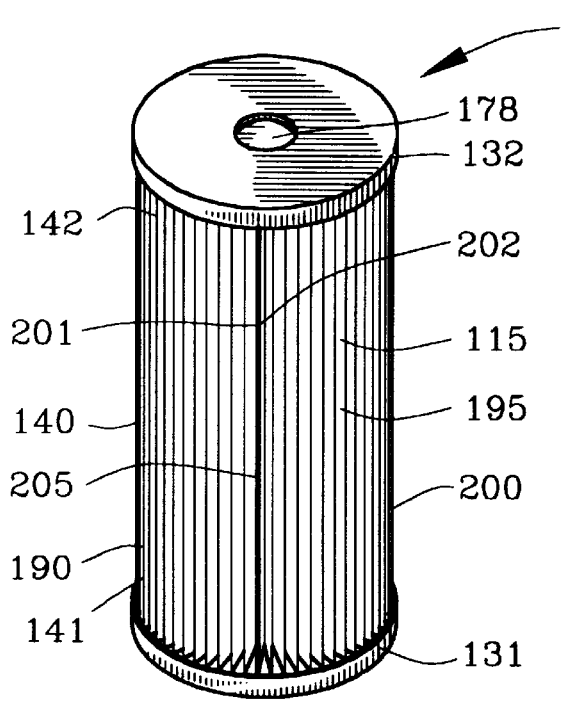
FIG. 5 is a top isometric view of a fluid filter insert of the present invention.
Figure 6:
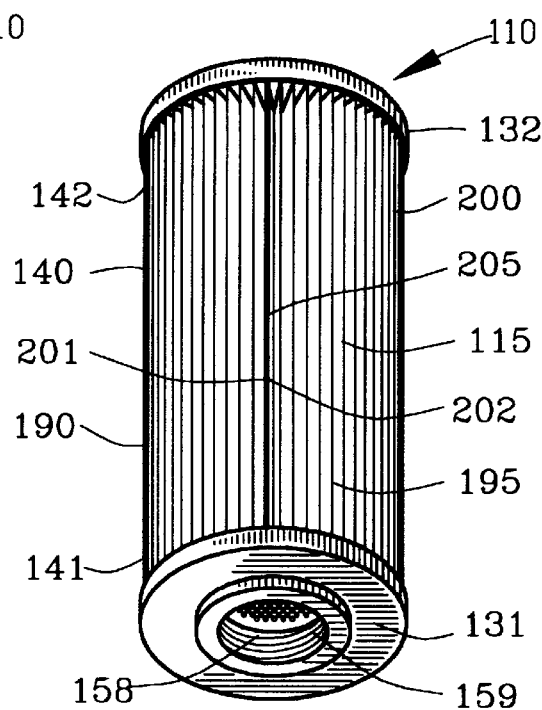
FIG. 6 is a bottom isometric view of the fluid filter insert of the present invention.
Figure 7:
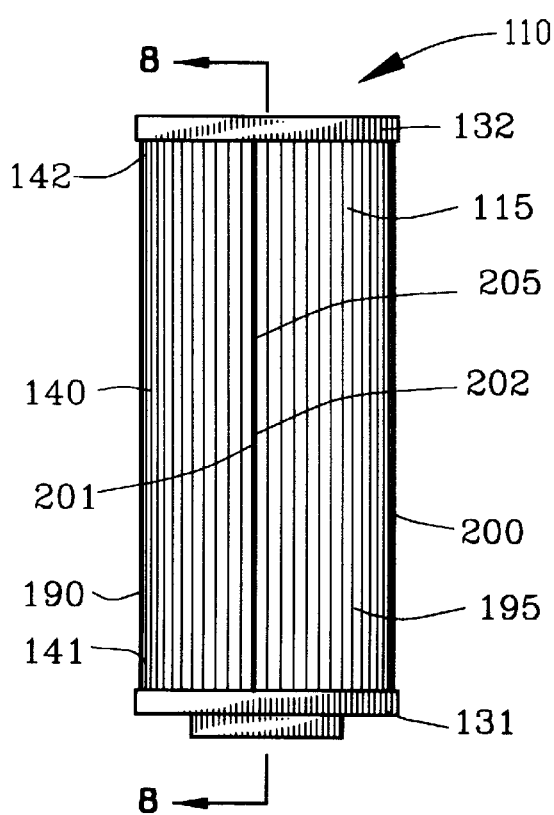
FIG. 7 is a side elevational view of FIG. 5.
Figure 8:
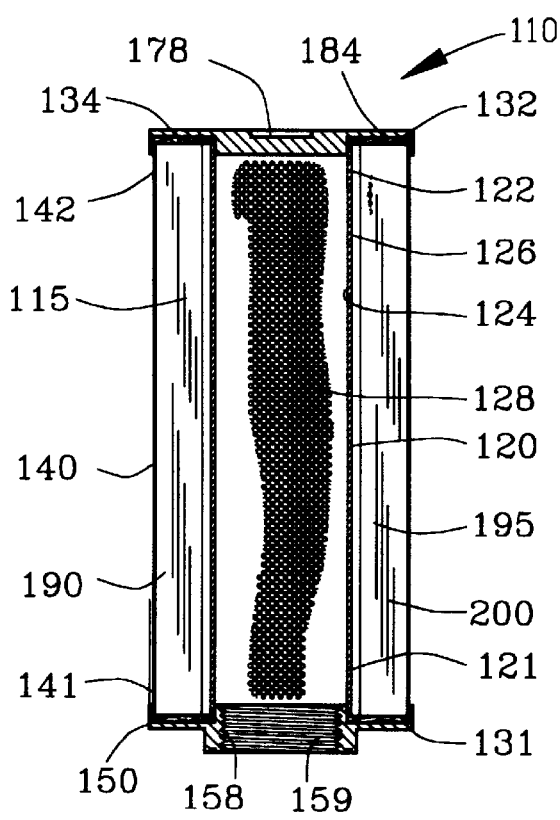
FIG. 8 is a sectional view along line 8—8 in FIG. 7.

FIGS. 5 and 6 are top and bottom isometric views of a first embodiment of a fluid filter insert 110 of the present invention. FIG. 7 is a side elevational view of FIG. 5 whereas FIG. 8 is a sectional view along line 8—8 in FIG. 7. The fluid filter insert 110 is designed for use within a conventional filter housing (not shown) for filtering suspended contaminants such as filtering suspended contaminants from a viscous fluid such as a polymer (not shown).

A first filter component includes a core member 120 extending between a first and a second core end 121 and 122 with the core member 120 being substantially cylindrically defined by an inner and outer cylindrical surface 124 and 126. A plurality of apertures 128 are defined within the core member 120 to extend between the inner and outer cylindrical surfaces 124 and 126 for enabling fluid passage therethrough.

The filter media 140 has a first and a second filter media end 141 and 142. The first and second core ends 121 and 122 of the core member 120 and the first and second filter media ends 141 and 142 of the filter media 140.

A second filter component includes a filter support shown as a first and second supports 131 and 132. The first and second filter media ends 141 and 142 of the filter media 140 are respectively secured to the first and second support 131 and 132 by an array of the metallic bonding fibers 150. The array of metallic bonding fibers 150 will be described in greater detail hereinafter.

The filter media 140 consists essentially of a matrix of metallic fibers with each of the metallic fibers having a diameter of less than 100 microns. As will be described in greater detail hereinafter, the metallic fibers are formed into a compressed sheet of a sintered matrix of randomly oriented metallic fibers to provide a porous filter media 140. Preferably, the metallic fibers are formed by a wire drawing process to provide a uniform diameter to the metallic fibers for uniformly filtering the fluid.

Figure 10:
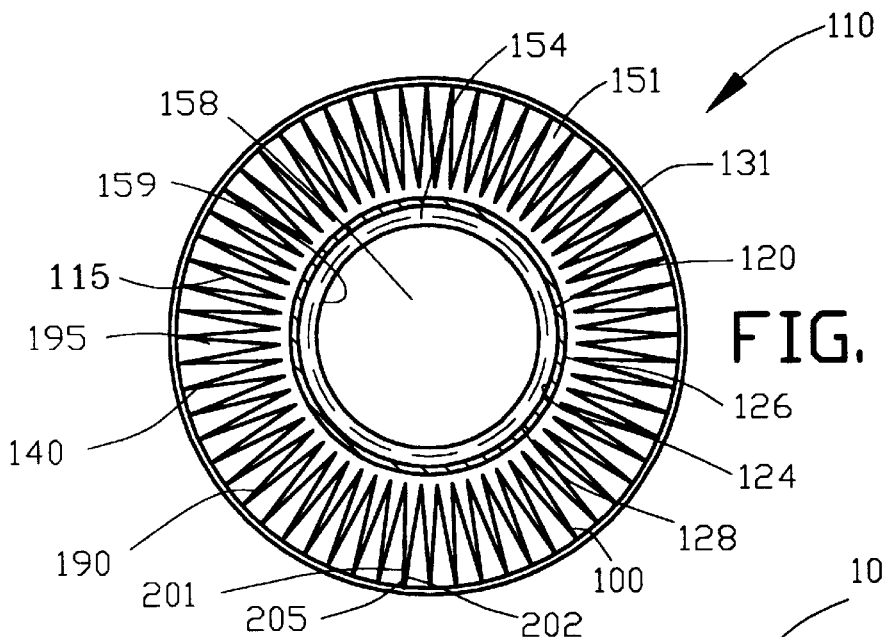
FIG. 10 is a view along line 10—10 in FIG. 9.
Figure 9:
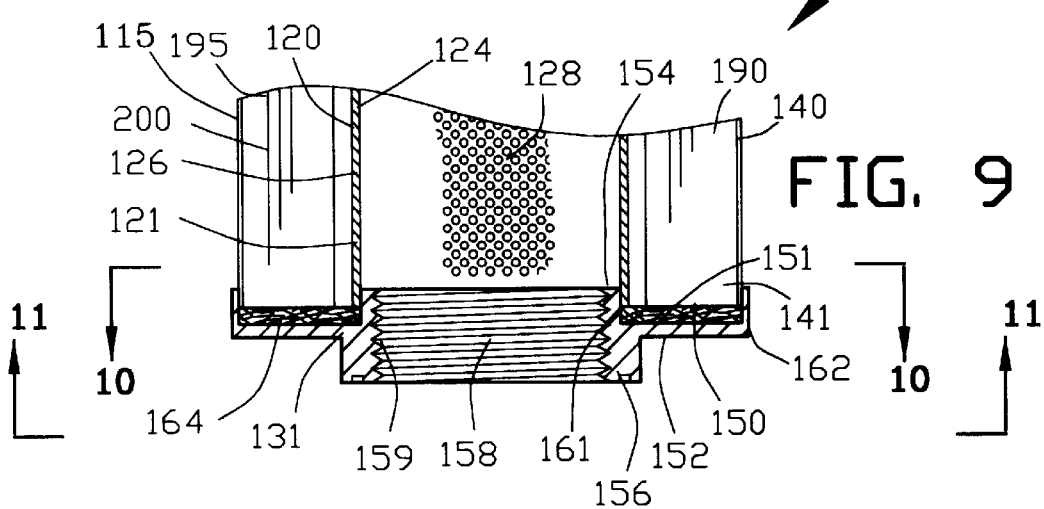
FIG. 9 is an enlarged view of a bottom portion of FIG. 8.
Figure 11:
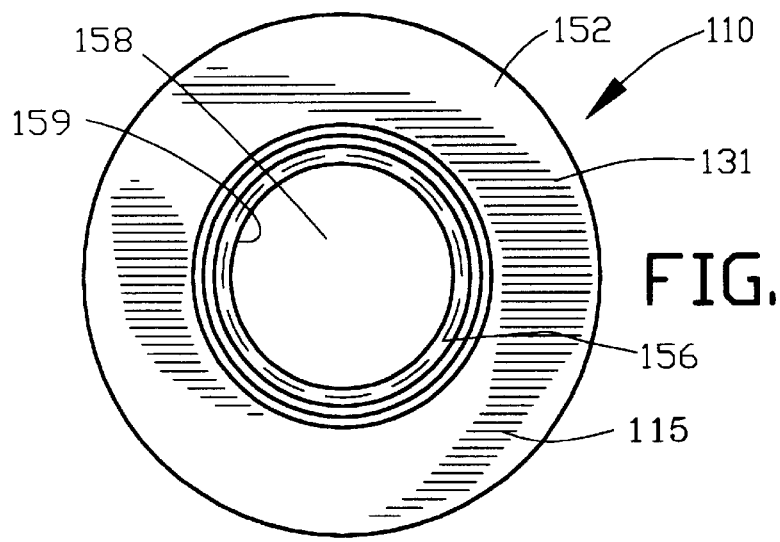
FIG. 11 is a view along line 11—11 in FIG. 9.

FIGS. 9–11 are enlarged views of the bottom portion of FIG. 8 illustrating the first embodiment of the fluid filter insert 110 of the present invention. The filter support includes the first and second supports 131 and 132. The first support 131 comprises a first inner surface and a first outer surface 151 and 152 with a first central boss 154 extending from the first inner surface 151 of the first support 131 and with an extension 156 extending from the outer surface 152 of the first support 131. A central orifice 15% extending between the first central boss 154 and the extension 1 56 is provided with threads 159 for affixing the fluid filter insert 110 to a support (not shown). The central orifice 158 provides communication between the first inner and the outer surfaces 151 and 152 of the first support 131.

A first inner annular shoulder 161 is defined by a periphery of the first central boss 154 whereas a first outer annular shoulder 162 extends from a periphery of the first support 131. The first inner and outer annular shoulders 161 and 162 define a first annular recess 164 therebetween. The first annular recess 164 has a general cup-shape for retaining the metallic bonding fibers 150 therein when the first support 131 is inverted relative to the position shown in FIG. 8.

The first core end 121 of the core member 120 is disposed within the first annular recess 164 with the first inner annular shoulder 161 being dimensioned to frictionally receive the first core end 121 of the core member 120. The first filter media end 141 of the filter media 140 is disposed within the first annular recess 164. The metallic bonding fibers 150 are disposed within the first annular recess 164 for securing the first core end 121 of the core member 120 and the first filter media end 141 of the filter media 140 to the first support 131.

Figure 13:
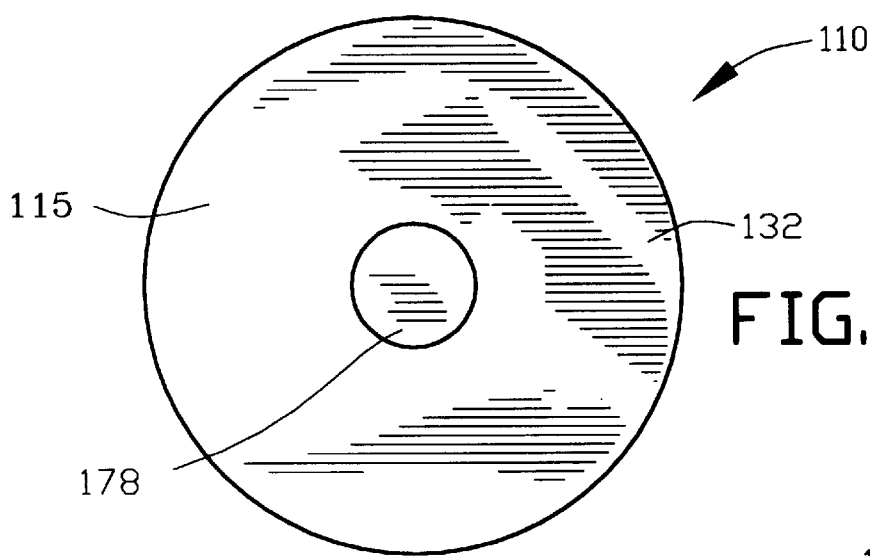
FIG. 13 is a view along line 13—13 in FIG. 12.
Figure 12:
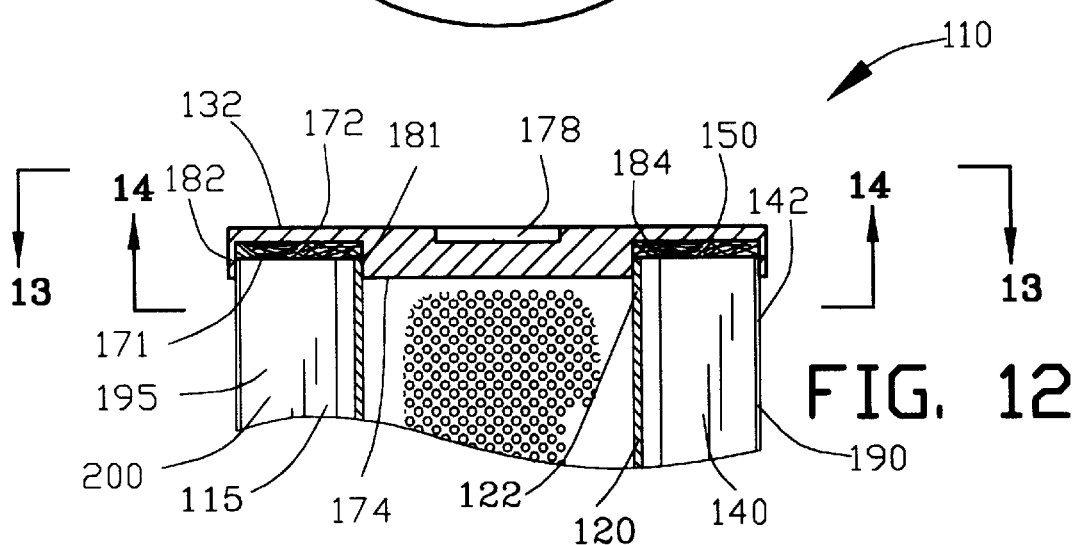
FIG. 12 is an enlarged view of a top portion of FIG. 8.
Figure 14:
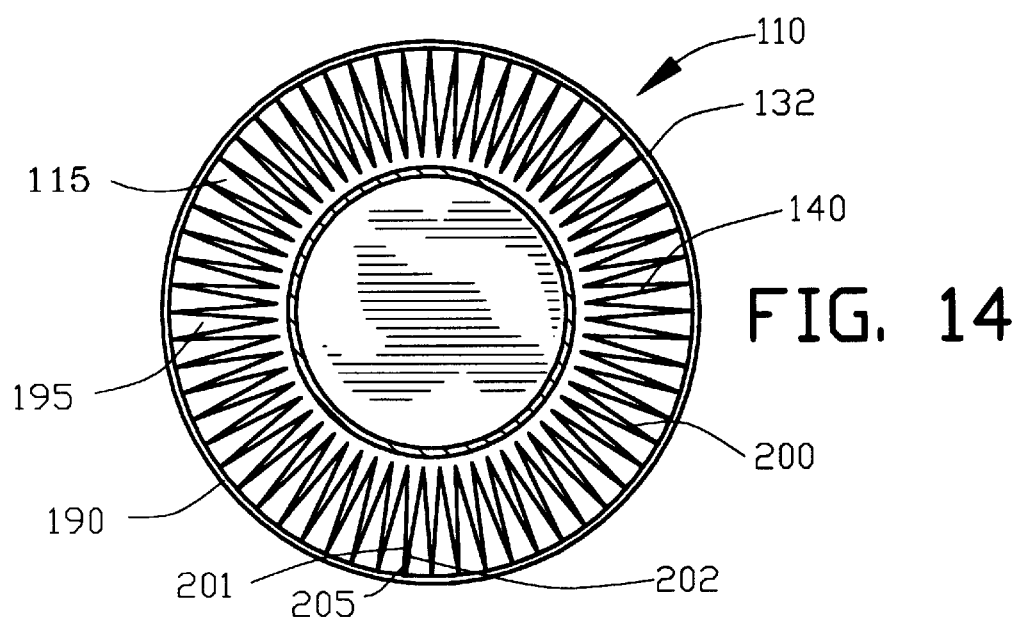
FIG. 14 is a view along line 14—14 in FIG. 12.

FIGS. 12–14 are enlarged views of the top portion of FIG. 8 illustrating the first embodiment of the fluid filter insert 110 of the present invention. The second support 132 comprises a second inner surface and a second outer surface 171 and 172 with a second central boss 174 extending from the second inner surface 171 of the second support 132. A central respite 178 is defined in the second outer surface 172 of the second support 132 for positioning the fluid filter insert 110 relative to second mounting (not shown).

A second inner annular shoulder 181 is defined by a periphery of the second central boss 174 whereas a second outer annular shoulder 1 82 extends from a periphery of the second support 132. The second inner and outer annular shoulders 181 and 182 define a second annular recess 184 therebetween. The second annular recess 184 has a general cup-shape for retaining the metallic bonding fibers 150 therein when the second support 132 is positioned as shown in FIG. 8.

The second core end 122 of the core member 120 is disposed within the second annular recess 184 with the second inner annular shoulder 181 being dimensioned to frictionally receive the second core end 122 of the core member 120. The second filter media end 142 of the filter media 140 is disposed within the second annular recess 184. The metallic bonding fibers 150 are disposed within the second annular recess 184 for securing second core end 122 of the core member 120 and the second filter media end 142 of the filter media 140 to the second support 132.

The first and second core ends 121 and 122 of the cylindrical core member 120 are secured to the first and second supports 131 and 132 for enabling fluid communication between the central orifice 158 of the first support 131 and the outer cylindrical surface 126 of the core member 120 through the plurality of apertures 128 therein.

The filter media 140 is shown as generally cylindrical and coaxially disposed relative to the cylindrical core member 120. The filter media 140 defines a general pleated or accordion shape for increasing the surface area of the filter media 140. The filter media 140 filters suspended contaminates in the fluid flowing through the filter media 140 via the central orifice 158 of the first support 131 and the plurality of apertures 128 of the core member 120.

The filter media 140 is shown as a sintered matrix of small diameter metallic fibers such as stainless steel fibers 190. Preferably, the small diameter stainless steel fibers 190 are formed through a wire drawing process to provide a uniform diameter of small diameter stainless steel fibers 190. The uniform diameter of small diameter stainless steel fibers 190 provides a uniform filtering of the suspended contaminants from the fluid.

The filter media 140 is formed by cladding and drawing a plurality of metallic wires for providing a drawn cladding with a reduced diameter. Several successive drawing processes may be required to obtain the metallic fibers with the desired diameter. The cladding is removed to provide the small diameter metallic fibers 190 having a length at least one hundred times the diameter. Preferably, each of the metallic fibers 190 has a diameter of less than 100 microns.

The metallic fibers 190 are opened to provide loose metallic fibers. The loose metallic fibers 190 are formed into a sheet 195. The sheet 195 of small diameter metallic fibers 190 is fused by a sintering process to form the filter media 140 having a multiplicity of pores therein. The sheet 195 of sintered filter media 140 is passed though a rolling press to compress the sheet 195 to have a uniform thickness with a high mechanical strength. The compressed sintered sheet 195 is in the form of a sheet 200 having a first and a second sheet end 201 and 202.

The sheet 200 of the sintered sheet 195 of the small diameter metallic fibers 190 is folded into the generally pleated or accordion shape and is bent into the generally cylindrical shape shown in FIGS. 10 and 14. The first and second sheet ends 201 and 202 are welded at 205 to form the generally cylindrical shape as shown in FIGS. 10 and 14. The array of metallic bonding fibers 150 are disposed in the first and second recesses 164 and 184 for sinter bonding the first and second filter media ends 141 and 142 and the first and second core ends 121 and 122 to the first and second mounting supports 131 and 132.

Figure 15:
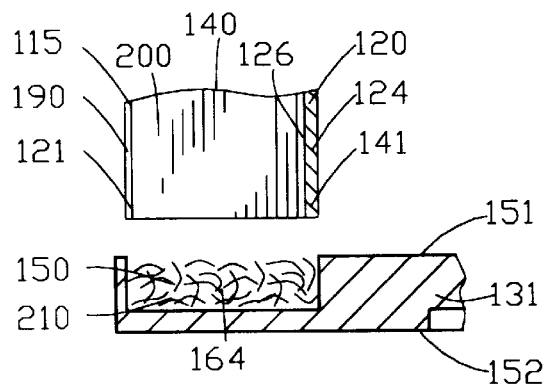
FIG. 15 is an enlarged view of a portion of FIG. 9 illustrating the introduction of metallic bonding fibers into an annular recess.

FIG. 15 is an enlarged view of a portion of FIG. 9 showing the introduction of the bonding fibers 150 into the first annular recess 164. In this embodiment of the invention, the metallic bonding fibers 150 are shown as loose randomly oriented metallic fibers 210 with each of the metallic bonding fibers 150 having a diameter less than or equal to each of the metallic fibers of said filter media 140. Preferably, each of the loose metallic fibers 210 has a diameter of less than 100 microns. The loose metallic bonding fibers 210 may be formed through a wire drawing process to provide a uniform diameter thereto.

Figure 16:
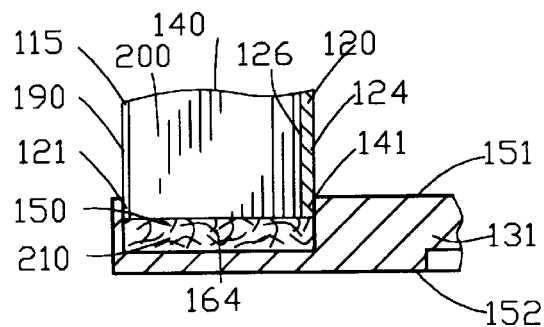
FIG. 16 is a view similar to FIG. 15 illustrating the bonding fibers securing the core member and the filter media to the support.

FIG. 16 is a view similar to FIG. 15 showing the loose metallic bonding fibers 210 securing the core member 120 and the filter media 140 to the first support 131. Upon the application of heat to the assembly of FIG. 16, the loose metallic bonding fibers 210 sinter bond the core member 120 and the filter media 140 to the first support 131. Preferably, the core member 120 and the filter media 140 and the first support 131 are all constructed of the same type of material as the loose metallic bonding fibers 210.

The application of heat to the assembly of FIG. 16, melts the surface of each of the loose metallic bonding fibers 210 to bond the surface of each of the loose metallic bonding fibers 210 to the surface of adjacent loose metallic bonding fibers 210. In addition, the melted surfaces of the loose metallic bonding fibers 210 bond to the surfaces of the matrix of the small diameter metallic fibers of the filter media 140. Furthermore, the melted surfaces of the loose metallic bonding fibers 210 bond to the surface of the first support 131.

Preferably, the core member 120, the filter media 140 and the first support 131 are all constructed of the same type of material as the loose metallic bonding fibers 210. In this embodiment of the invention, the core member 120, the filter media 140, the first support 131 and the loose metallic bonding fibers 210 are all constructed of stainless steel.

Figure 17:
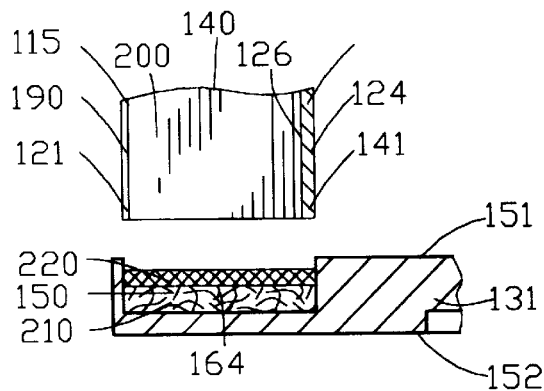
FIG. 17 is a view similar to FIG. 15 illustrating a first variation of the introduction of metallic bonding fibers and a bonding pad of sintered metallic fibers into the annular recess.

FIG. 17 is an enlarged view of a portion of FIG. 9 illustrating a first variation of the process showing the introduction of bonding fibers 150 and a bonding pad 220 of sintered fibers into the first annular recess 164. The metallic bonding fibers 150 are shown as loose randomly oriented metallic fibers 210 with each of the metallic bonding fibers 150 having a diameter equal or less than or equal to each of the metallic fibers of said filter media 140. Preferably, each of the loose metallic fibers 210 has a diameter of less than 100 microns. The loose metallic bonding fibers 210 may be formed through a wire drawing process to provide a uniform diameter thereto.

The bonding pad 220 comprises a resilient pad formed from a sintered matrix of randomly oriented metallic fibers. Preferably, the resilient bonding pad 220 is an uncompressed sheet of a sintered matrix of randomly oriented metallic fibers. Preferably, the metallic fibers of the bonding pad 220 have a diameter less than or equal to each of the metallic fibers of said filter media 140 and may be formed by a wire drawing process. The bonding pad 220 may be formed of the filter media 140.

Figure 18:
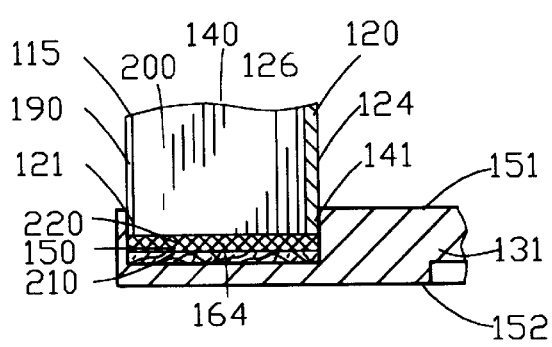
FIG. 18 is a view similar to FIG. 17 showing the metallic bonding fibers and the bonding pad of sintered metallic fibers securing the core member and the filter media to the support.

FIG. 18 is a view similar to FIG. 17 showing the loose metallic bonding fibers 210 and the bonding pad 220 securing the core member 120 and the filter media 140 to the first support 131. Upon the application of heat to the assembly of FIG. 16, the loose metallic bonding fibers 210 and the bonding pad 220 sinter bond the core member 120 and the filter media 140 to the first support 131. The loose metallic bonding fibers 21(0 are compressed during the sinter bonding process. In addition, the bonding pad 220 is slightly compressed during the sinter bonding process.

Figure 19:
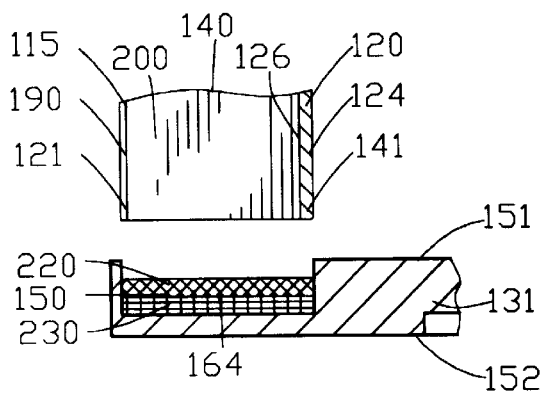
FIG. 19 is a view similar to FIG. 15 illustrating a second variation of the introduction of plural bonding pads of sintered metallic fibers into the annular recess.

FIG. 19 is an enlarged view of a portion of FIG. 9 illustrating a second variation of the process showing the introduction of plural bonding pads 220 and 230 of sintered fibers into the first annular recess 164. The bonding pad 220 comprises a resilient pad formed from a sintered matrix of randomly oriented metallic fibers. Preferably, the resilient bonding pad 220 is an uncompressed sheet of a sintered matrix of randomly oriented metallic fibers. Preferably, the metallic fibers of the bonding pad 220 have a diameter less than or equal to each of the metallic fibers of said filter media 140 and may be formed by a wire drawing process. The bonding pad 220 may be formed of the filter media 140. The bonding pad 230 may be equivalent to the structure of the bonding pad 220 having a weight of 2.0 to 50.0 ounces per square yard.

Figure 20:
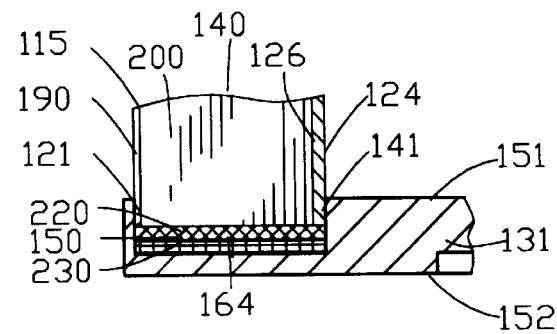
FIG. 20 is a view similar to FIG. 19 showing the plural bonding pads of sintered metallic fibers securing the core member and the filter media to the support.

FIG. 20 is a view similar to FIG. 19 showing the plural bonding pads 220 and 230 of sintered fibers securing the core member 120 and the filter media 140 to the support 131. Upon the application of heat to the assembly of FIG. 19, the bonding pads 220 and 230 sinter bond the core member 120 and the filter media 140 to the first support 131. The bonding pads 220 and 230 are slightly compressed during the sinter bonding process.

The sinter bonding of the core member 120 and the filter media 140 to the first support 131 exhibits a bond strength substantially equal to or greater than the cohesion strength of the filter media 140. Furthermore, the sinter bonding of the core member 120 and the filter media 140 to the first support 131 exhibits a bubble point leakage substantially equal to or greater than the filter media 140.

In one example of the present invention, each of the core member 120 and the first and second supports 131 and 132 was fabricated from unitary pieces of 304L stainless steel. The metallic bonding fibers 150 was stainless steel fibers.

FIG. 21 illustrates a first step in the method of making the first embodiment of the fluid filter insert 110 shown in FIGS. 1–20. The second support 132 is orientated with the second annular recess 184 facing upwardly and the metallic bonding fibers 150 are introduced into the second annular recess 184.

FIG. 22 illustrates a second step in the method of making the first embodiment of the fluid filter insert 110 showing the insertion of the second core end 122 and the second filter media end 142 into the metallic bonding fibers 150 disposed in the second annular recess 184.

FIG. 23 illustrates a third step in the method of making the fluid filter insert showing the inversion of the second support 132, the core member 120 and the filter media 140 and the introduction of metallic bonding fibers 150 into the annular recess 164 of the first support 131.

FIG. 24 illustrates a fourth step in the method of making the first embodiment of the fluid filter insert 110 showing the insertion of the first core end 121 and the first filter media end 141 into the metallic bonding fibers 150 disposed in the first annular recess 164 of the first support 131.

FIG. 25 illustrates a fifth step in the method of making the first embodiment of the fluid filter insert 110 showing the application of a compressive force and the application of heat for sintering the metallic bonding fibers 150 disposed in the first and second annular recesses 164 and 184. Heat is applied for melting the surfaces of the metallic bonding fibers 150 disposed in the first and second annular recesses 164 and 184 to secure the core member 120 and the filter media 140 to the first and second supports 131 and 132. The application of heat for melting the surface of the metallic bonding fibers 150 may include melting and solidifying the metallic bonding fibers 150 in a hydrogen atmosphere.

FIG. 26 illustrates a sixth step in the method of making the first embodiment of the fluid filter insert 110 showing the core member 120 and the filter element 140 secured to the first and second supports 131 and 132.

Figure 27:
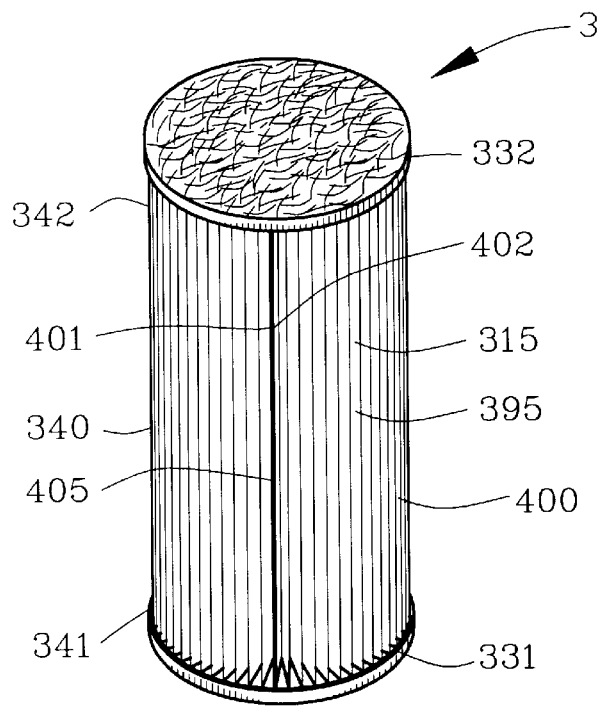
FIG. 27 is a top isometric view of a fluid filter insert of the present invention.
Figure 28:
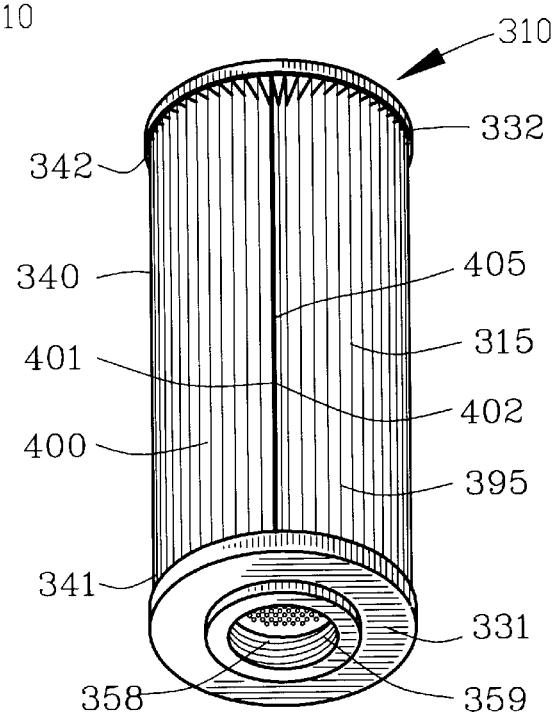
FIG. 28 is a bottom isometric view of the fluid filter insert of the present invention.

FIGS. 27 and 28 are top and bottom isometric views of a second embodiment of a fluid filter insert 310 of the present invention. The fluid filter insert 310 is designed for use within a conventional filter housing (not shown) for filtering suspended contaminants such as filtering suspended contaminants.

Figure 29:
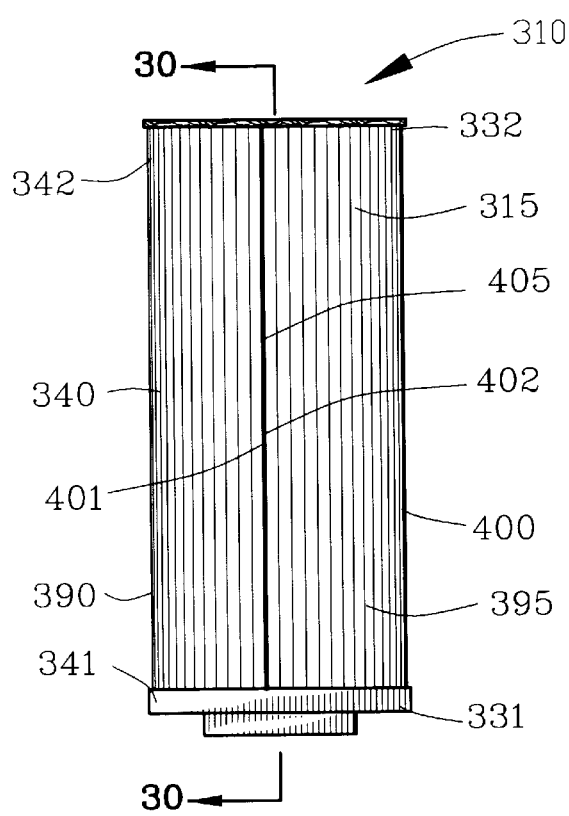
FIG. 29 is a side elevational view of fluid filter of FIGS. 27 and 28.
Figure 30:
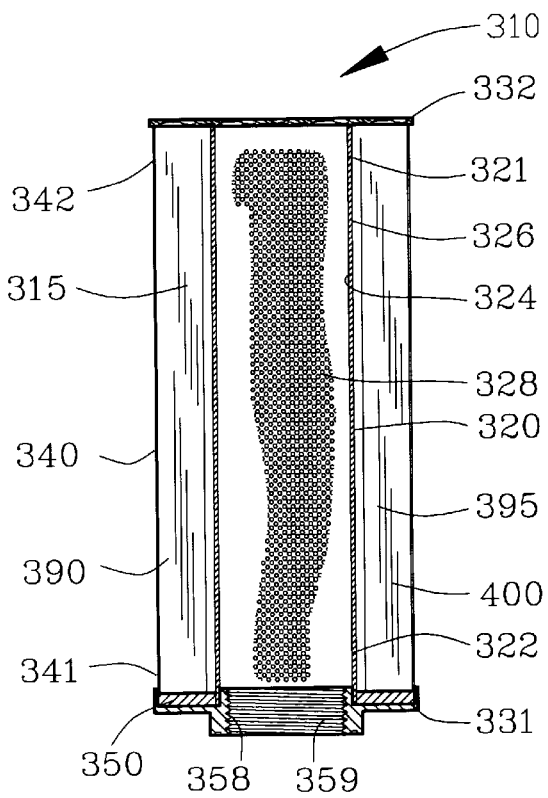
FIG. 30 is a sectional view along line 30—30 in FIG. 29.

FIG. 29 is a side elevational view of the fluid filter insert 310 of FIGS. 27 and 28 with FIG. 30 being a sectional view thereof. The fluid filter insert 310 comprises a first filter component 315 including a core member 320 for supporting a filter media 340. The core member 320 and the filter media 340 are secured to a second filter component shown as a filter support.

In this embodiment of the invention, the second filter support is shown as a first and a second support 331 and 332.

The first support 331 is shown as a conventional metallic filter end cap whereas the second support 332 is shown as a filter end member that consists essentially of a sintered assembly of metallic fibers. The core member 320 and the filter media 340 are secured to the first and second supports 331 and 332 as will be described in greater detail hereinafter.

The core member 320 extends between a first and a second core end 321 and 322 with the core member 320 being substantially cylindrically defined by an inner and outer cylindrical surface 324 and 326. A plurality of apertures 328 are defined within the core member 320 to extend between the inner and outer cylindrical surfaces 324 and 326 for enabling fluid passage therethrough.

The filter media 340 has a first and a second filter media end 341 and 342. The first and second core ends 321 and 322 of the core member 320 and the first and second filter media ends 341 and 342 of the filter media 340 are respectively secured to the first and second supports 331 and 332.

The first core end 322 of the core member 320 and the first filter media end 341 of the filter media 340 are secured to the first support 331 solely by metallic bonding fibers 350. The first second end 321 of the core member 320 and the second filter media end 342 of the filter media 340 are secured to the second support 332 solely by a sinter bond between the second filter media end 342 and the second support 332.

The filter media 340 comprises a matrix of metallic fibers with each of the metallic fibers 140 as set forth above. The bottom portion of FIG. 30 is identical to the structure shown previously with reference to FIGS. 9–11.

Figure 32:
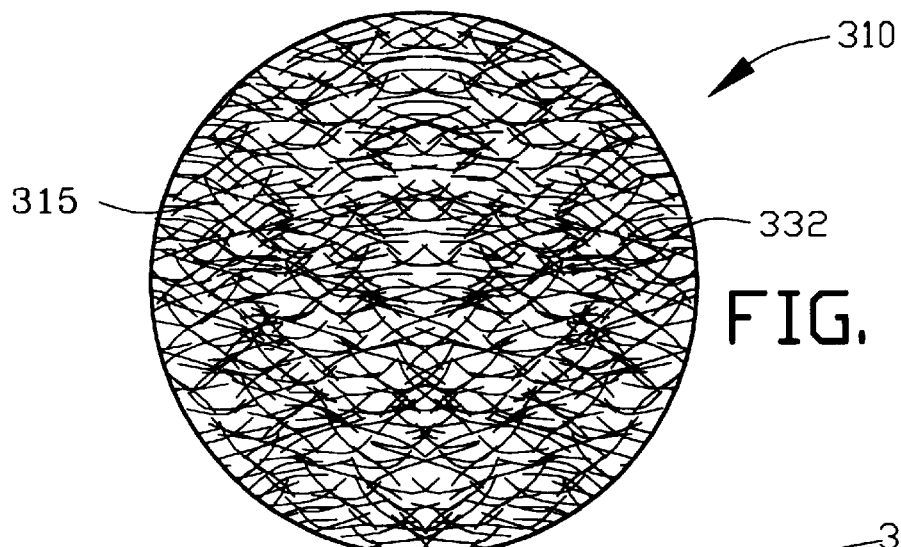
FIG. 32 is a view along line 32—32 in FIG. 31.
Figure 31:
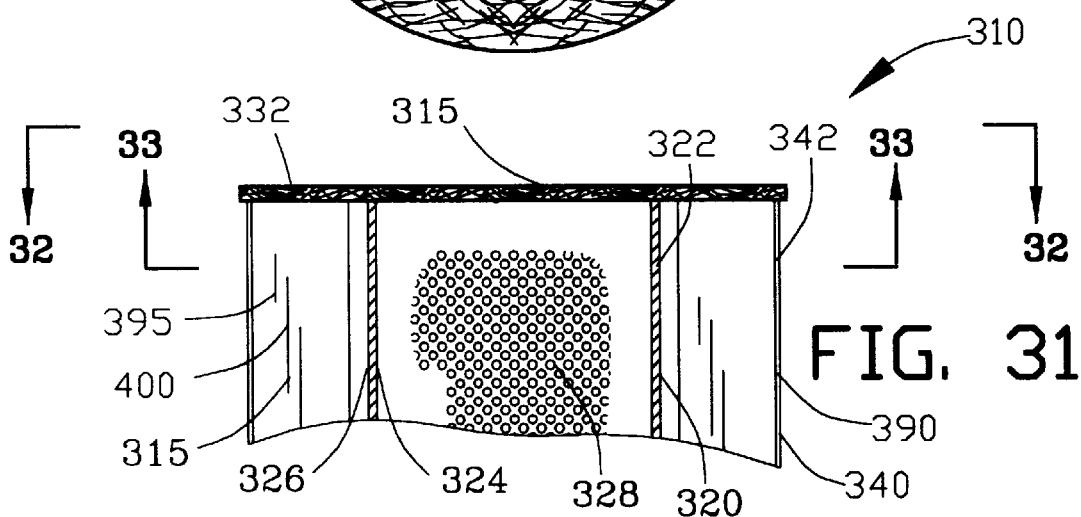
FIG. 31 is an enlarged view of a top portion of FIG. 29.
Figure 33:
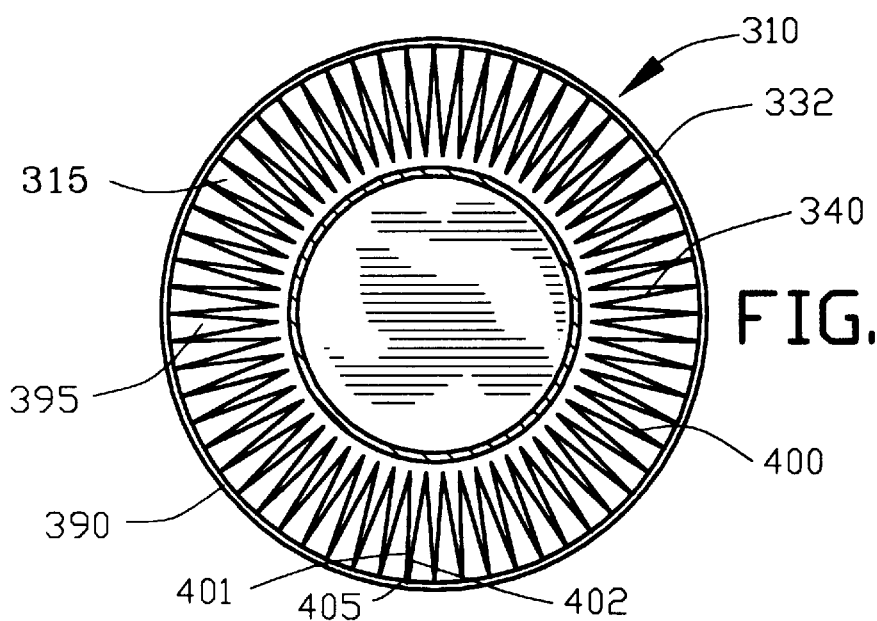
FIG. 33 is a sectional view along line 33—33 in FIG. 31.

FIGS. 31–33 are enlarged views of the top portion of FIG. 30 illustrating the second embodiment of the fluid filter insert 310 of the present invention. The second support 332 is shown as a filter end member fabricated from a sintered assembly of metallic fibers. The second end 321 of the core member 320 and the second filter media end 342 of the filter media 340 are secured to the second support 332 solely by a sinter bond between the second filter media end 342 and the second support 332.

FIG. 34 illustrates a first step in the method of making the second embodiment of the fluid filter insert 310 shown in FIGS. 27–30. The first support 331 is orientated with the first annular recess 364 facing upwardly and the metallic bonding fibers 350 are introduced into the first annular recess 364.

FIG. 35 illustrates a second step in the method of making the second embodiment of the fluid filter insert 310 showing the insertion of a first core end 321 and a first filter media end 341 into the metallic bonding fibers 350 disposed in the first annular recess 364.

FIG. 36 illustrates a third step in the method of making the second embodiment of the fluid filter insert showing the positioning of the second support 332 adjacent to the second end 322 of the core member 320 and adjacent to the second end 342 of the filter media 340.

FIG. 37 illustrates a fourth step in the method of making the second embodiment of the fluid filter insert showing the engagement of the second support 332 with the second end 322 of the core member 320 and with the second end 342 of the filter media 340. FIG. 37 illustrates a mold 450 being positioned adjacent to the second support 332.

FIG. 38 illustrates a fifth step in the method of making the second embodiment of the fluid filter insert 310 showing the application of a compressive force and the application of heat for sintering the metallic bonding fibers 350 disposed in the first annular recess 364 and for sinter bonding the first support 331 to the first end 321 of the core member 320 and with the first end 341 of the filter media 340. Concomitantly therewith, the application of the compressive force and the application of heat sinter bonds the second support 332 to the second end 322 of the core member 320 and to the second end 342 of the filter media 340.

The applied heat melts the surfaces of the metallic bonding fibers 350 disposed in the first annular recess 364 to secure the core member 320 and the filter media 340 to the first support 331. Simultaneously, the applied heat melts the surfaces of the metallic fibers of the second support 332 to secure the core member 320 and the filter media 340 to the second support 332. Preferably, the application of heat for melting the surface of the metallic bonding fibers 350 and the metallic fibers of the second support 332 may include melting and solidifying the metallic bonding fibers 350 in a hydrogen atmosphere.

FIG. 39 illustrates a sixth step in the method of making the second embodiment of the fluid filter insert 310 showing the core member 320 and the filter element 340 secured to the first and second supports 331 and 332.

FIG. 40 is a magnified partial view of FIG. 37 illustrating the positioning of the second support 332 adjacent to the second core end 322 of the core member 320 and the positioning of a first type of mold 450 adjacent to the second support 332. The second support 332 is shown as a filter end member constructed of a sintered matrix of randomly oriented metallic fibers. The second support 332 may be resilient being formed from an uncompressed sheet of a sintered matrix of randomly oriented metallic fibers. In the alternative, the second support 332 may be formed from a compressed sheet of a sintered matrix of randomly oriented metallic fibers. Preferably, the metallic fibers of the second support 332 have a diameter less than or equal to each of the metallic fibers of said filter media 340 and may be formed by a wire drawing process. In one embodiment of the invention, the second support 332 is formed of the filter media 340. In many instances, the second support 332 may be formed from scraps or unused portions of filter media 340.

FIG. 41 is a magnified partial view of FIG. 38 illustrating the mold 450 applying a compressive force for pressing the second support 332 against the second core end 322 of the core member 320 during the application of heat. Upon the application of heat to the assembly of FIG. 25, the second support 332 sinter bond with the second end 322 of the core member 320 and sinter bonds with the second end 342 of the filter media 340. The second support 332 is slightly compressed during the sinister bonding process.

The sinter bonding of the core member 320 and the filter media 340 to the second support 332 exhibits a bond strength substantially equal to or greater than the cohesion strength of the filter media 340. Furthermore, the sinter bonding of the core member 320 and the filter media 340 to the second support 332 exhibits a bubble point leakage substantially equal to or greater than the filter media 340. Furthermore, the total filtering area of the filter media 340 is increased since the second support 332 functions as a filtering area.

FIG. 42 is a magnified partial view of FIG. 37 illustrating the positioning of the second support 332 adjacent to the second core end 322 of the core member 320 and the positioning of a second type of mold 460 adjacent to the second support 332. The second support 332 is shown as a filter end member constructed of a sintered matrix of randomly oriented metallic fibers. The second support 332 may be formed from an uncompressed or compressed sheet of a sintered matrix of randomly oriented metallic fibers. In this embodiment of the invention, the second support 332 has a second support portion 334 extending beyond the second end 342 of the outer periphery 344 of the filter media 340.

FIG. 43 is a magnified partial view of FIG. 38 illustrating the mold 460 applying a compressive force for pressing the second support 332 against the second core end 322 of the core member 320 during the application of heat. The compressive force of the portion 470 of the mold 460 deforms the second support portion 334 and presses the second support portion 334 against a lateral surface 346 of the filter media 340. Upon the application of heat, the second support 332 sinter bond with the second end 322 of the core member 320 and sinter bonds with the second end 342 of the filter media 340. In addition, the second support portion 334 is sinter bonded to the lateral surface 346 of the filter media 340. The second support 332 is slightly compressed during the sinter bonding process. The sinter bonding of the second support portion 334 to the lateral surface 346 of the filter media 340 exhibits a bond strength greater than the bond formed in FIGS. 40 and 41.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved fluid filter assembly for filtering a fluid, comprising:

a core member extending between a first and a second core end;

a first endcap formed from a rigid metallic material secured to said first end of said core member;

a filter media comprising a sintered matrix of metallic fibers disposed about and supported by said core member;

said filter media extending between a first filter media end and a second filter media end;

a sinter bond comprising a matrix of metallic fibers for bonding said first filter media end of said filter media to said first endcap;

a second endcap consisting essentially of a sintered matrix of metallic fibers; and said second endcap being secured to said second filter media end of said filter media solely by said metallic fibers of said filter media bonding with said metallic fibers of said second endcap.

2. An improved fluid filter assembly for filtering a fluid as set forth in claim 1, wherein said filter media comprises a sintered matrix of randomly oriented metallic fibers to provide a porous filter media.

3. An improved fluid filter assembly for filtering a fluid as set forth in claim 1, wherein said filter media comprises a compressed sheet of a sintered matrix of randomly oriented metallic fibers.

4. An improved fluid filter assembly for filtering a fluid as set forth in claim 1, wherein said filter media comprises metallic fibers formed through a wire drawing process to provide a uniform diameter for uniformly filtering the fluid.

5. An improved fluid filter assembly for filtering a fluid as set forth in claim 1, wherein said filter media comprises a matrix of metallic fibers with each of said metallic fibers having a diameter of less than 100 microns; and said metallic fibers being formed through a wire drawing process to provide a uniform diameter for uniformly filtering the fluid.

6. An improved fluid filter assembly for filtering a fluid as set forth in claim 1, wherein said first endcap has an annular recess; and said sinter bond comprising an array of metallic bonding fibers being disposed in said annular recesses for sinter bonding said filter media to said first endcap.

7. An improved fluid filter assembly for filtering a fluid as set forth in claim 1, wherein said second endcap is formed from a compressed sintered assembly of randomly oriented metallic fibers.

8. An improved fluid filter assembly for filtering a fluid as set forth in claim 1, wherein said second endcap is formed from a sintered assembly of randomly oriented metallic fibers compressed into a generally rigid filter end member.

9. An improved fluid filter assembly for filtering a fluid as set forth in claim 1, wherein said second endcap is formed from a sintered assembly of randomly oriented stainless steel fibers formed into a compressed sheet with each of said metallic fibers having a diameter of less than 100 microns.

10. An improved fluid filter assembly for filtering a fluid as set forth in claim 1, wherein said second endcap is formed from a sintered assembly of randomly oriented stainless steel fibers formed into a compressed sheet with each of said metallic fibers being formed through a wire drawing process; and each of said metallic fibers having a diameter of less than 100 microns.

11. An improved fluid filter assembly for filtering a fluid as set forth in claim 1, wherein said second endcap is formed from filter media.

12. An improved fluid filter assembly for filtering a fluid, comprising:

a filter element including a filter media consisting essentially of a matrix of metallic fibers;

a filter end member consisting essentially of a sintered assembly of metallic fibers; and;

said filter end member being secured to said filter media solely by said metallic fibers of said filter media bonding with said metallic fibers of said filter end member.

13. The method of making a fluid filter assembly for filtering a fluid, comprising the steps of:

fabricating a filter media consisting essentially of a matrix of metallic fibers;

providing a filter end member consisting essentially of a sintered assembly of metallic fibers; and heating the metallic fibers of the filter end member and the filter media for securing the filter end member to the filter media solely by the metallic fibers of the filter media bonding with the metallic fibers of the filter end member.

14. The method of making a fluid filter assembly for filtering a fluid as set forth in claim 13, wherein the step of fabricating the filter media comprises sintering a matrix of randomly oriented metallic fibers to provide a porous filter media.

15. The method of making a fluid filter assembly for filtering a fluid as set forth in claim 13, wherein the step of fabricating the filter media comprises drawing metallic fibers in a wire drawing process to provide a uniform diameter thereof; and forming a matrix of randomly oriented metallic fibers to provide a porous filter media.

16. The method of making a fluid filter assembly for filtering a fluid as set forth in claim 13, wherein the step of providing a filter end member comprises fabricating a filter end member solely from a sintered array of randomly oriented metallic fibers.

17. The method of making a fluid filter assembly for filtering a fluid as set forth in claim 13, wherein the step of providing a filter end member comprises fabricating the filter end member by drawing metallic fibers in a wire drawing process to provide a uniform diameter thereof; and forming an assembly of randomly oriented metallic fibers.

18. The method of making a fluid filter assembly for filtering a fluid as set forth in claim 13, wherein the step of heating the metallic fibers includes heating the metallic fibers of the filter end member and the filter media in a hydrogen atmosphere for melting at least the surface of each of the metallic fibers.

* * * * *